Oct. 18, 1955       R. A. STAAT       2,720,731
WORK HOLDER FOR TAP SHARPENING
Filed March 27, 1952
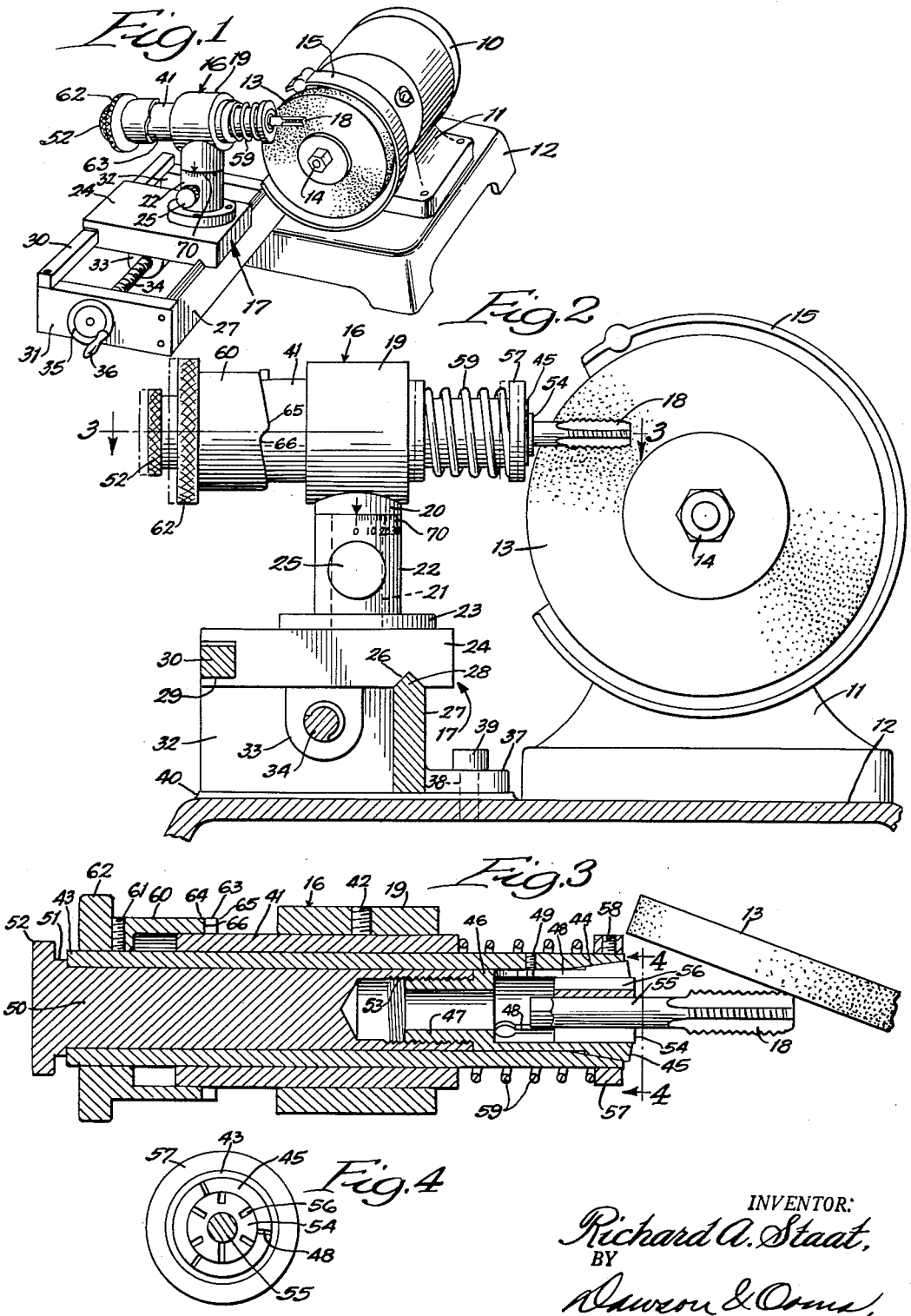
INVENTOR:
Richard A. Staat,
BY
Dawson & Ooms,
ATTORNEYS.

United States Patent Office 2,720,731
Patented Oct. 18, 1955

2,720,731
WORK HOLDER FOR TAP SHARPENING
Richard A. Staat, Chicago, Ill.
Application March 27, 1952, Serial No. 278,829
3 Claims. (Cl. 51—123)

This invention relates to a grinding device for taps and like tools, and more particularly to a work holder or fixture for tap sharpening.

Taps used for internally threading a bore or hole generally have a plurality of fluted cutting surfaces extending longitudinally of the tap and spaced apart by low portions or lands. The forward end of the tap or end that initially enters the bore is chamfered and each fluted cutting surface on the chamfered portion is formed with a radial relief; that is, the leading edge of the fluted cutting surface has a larger diameter, as measured from the center of the tap, than the trailing edge of the cutting threads. Taps are provided with various angles of chamfer, depending upon the purpose for which the tap is used. For example, a bottoming tap will have a greater angle of chamfer than a general purpose tap or tap used for cutting the threads along the length of a bore.

It has been found that the cutting threads on the chamfered end of taps become dull much more rapidly than the remainder of the cutting threads and must be sharpened numerous times during the life of the tool, while the remaining threads may never require sharpening. Since these tools are relatively expensive, it is economical to sharpen the dulled surfaces and thereby increase the service life of each tool. The more rapidly a tool can be sharpened, the more economical the sharpening process becomes. Also, the more accurate the cutting surface can be sharpened with the required radial relief, the more efficient the tool is in later operation.

It is known that tap grinding and sharpening devices have been developed and have some limited usage, but these machines are complicated and very expensive, and do not enjoy wide usage in shops where tapping tools are used. As a result, the prevalent practice today is to sharpen taps by hand, which is a slow and inaccurate procedure attended by difficulty and error in grinding on the proper chamfer angle, inaccuracies in sharpening the fluted cutting threads with proper radial relief and consequent inefficient operation of the tool, and decreased tool life because of excessive removal of the threads.

It is, therefore, an object of this invention to provide a device for quickly, easily and accurately sharpening taps and like tools. Another object of this invention is to provide a work holder for tap sharpeners that will cause the chamfered cutting threads to be ground or sharpened with radial relief. Still another object is to provide a work holder in which the tap is drawn clear of the sharpening surface when a land is adjacent said surface. A further object is to provide a work holder that is readily adapted to sharpen the chamfered cutting threads of taps having different angles of chamfer, various lengths, and different numbers of fluted cutting surfaces, or right- or left-handed threads. Still a further object is to provide an inexpensive, simple, and sturdy work holder having a minimum number of moving parts so that maintenance is held to a minimum. Additional objects and advantages will appear as the specification proceeds.

Briefly, my invention comprises a work holder having means for supporting a tap or like tool in engagement with a rotatably mounted abrasive surface at any required angle. Means are included to rotate the tool so that each fluted cutting surface successively engages the abrasive wheel while at the same time the tool is cyclically withdrawn axially from the sharpening surface, with the result that each fluted cutting surface of the tap is ground in radial relief and the tool is withdrawn clear of the grinding surface when a land of the tool is adjacent the abrasive wheel.

It is believed that my invention can best be understood by referring to an embodiment illustrated by the accompanying drawing, in which—

Figure 1 is a perspective view of a complete tap sharpener; Fig. 2, a side view in elevation in which a part of a work holder carriage is shown in cross section; Fig. 3, a sectional view taken along the line 3—3 of Fig. 2; and Fig. 4, a sectional view taken along the line 4—4 of Fig. 3.

As seen best in Figs. 1 and 2, the numeral 10 designates a motor which is mounted upon a pedestal 11 secured to a base or work table 12. An abrasive wheel 13 is secured to the motor shaft by any suitable means such as the nut 14. The usual safety guard 15 is shown covering a portion of the abrasive wheel. An adjustable work holder 16 is mounted on a longitudinally adjustable carriage 17. A tap 18 is shown mounted in the work holder 16.

More specifically, the work holder 16 comprises a collar 19 secured to a vertical shaft 20 having a lower portion 21 reduced in diameter and pivotally received within a vertical tube 22. The tube 22 has an integral flange member 23 which is mounted upon a horizontal base or plate 24 by any suitable means such as bolting or welding. The tube 22 is provided with a set screw 25 that may be tightened to secure the shaft 20 in adjustment. The set screw is provided with a knurled knob so that it may be easily grasped for turning. The horizontal plate 24 is provided with an inverted V-shaped channel 26 along one edge and on the bottom thereof. A vertical runner 27 is equipped with an upper knife edge 28 adapted to be received within the inverted V-shaped channel 26. A recess 29 is provided in the plate 24 and is adapted to receive an elongated rectangular runner 30. The runners 27 and 30 are secured in parallel alignment by end plates 31 and 32. The runners may be secured to the end plates by bolting or welding.

An internally threaded collar or nut 33 is secured to the under surface of the plate 24 and is adapted to receive a threaded shaft or elongated bolt 34 which is supported by the end plates or walls 31 and 32. One end of the shaft 34 extends through the end plate 31 and the extension is equipped with a wheel 35 having a handle 36. The shaft 34 is readily rotated by turning the wheel 35. A horizontal securing member 37 is welded to the runner 27 and is provided with spaced-apart apertures 38 receiving bolts 39 that secure the member 37 and the runner 27 to a suitable base plate 40 or to the work table 12.

It is apparent that the work holder 16 may be moved toward or away from the abrasive wheel 13 by rotating the wheel 35 and shaft 34 in the appropriate direction. The plate 24 is slidably mounted on the runners 27 and 30 and is readily adjustable longitudinally thereof by rotating the shaft 34.

In addition to the collar 19 and shaft 20, the work holder consists of an outer sleeve 41 adjustably received within the collar 19. A set screw 42 locks the sleeve 41 in adjustment.

An inner sleeve 43 is rotatably and slidably received within the outer sleeve 41. The inner sleeve 43 is internally coned at the forward end 44. An externally coned expansible sleeve or collet 45 is received within the coned portion of the inner sleeve 43. The coned sleeve or collet 45 has a rearwardly extending cylindrical portion 46 terminating in a threaded portion 47 of reduced diameter. A plurality of longitudinally extending slots 48 are provided in the coned section of the collet 45 and permit it to be readily contracted to secure a bushing or other object received therein against movement. A key 49 extending through the inner sleeve 43 is received within an extension of one of the longitudinal slots 48 and prevents the collet from rotating with respect to the sleeve 43 but permits the collet to be readily inserted and withdrawn from the forward end of the sleeve 43.

A rod or shaft 50 is rotatably and slidably received within the inner sleeve 43. The shaft 50 is equipped with a neck portion 51 engaging the rearward end of the sleeve 43. The shaft 50 is further enlarged to provide a knurled knob 52 to facilitate rotating the shaft 50. The forward end of the shaft 50 has a centrally aligned bore 53 internally threaded and adapted to receive the threaded end 47 of the collet 45.

After the collet 45 has been inserted in the forward end of the inner sleeve 43, the shaft 50 is inserted through the rear portion of the sleeve 43 and rotated so as to threadedly engage the threaded end 47 of the collet 45. As the shaft 50 is tightened onto the collet 45, the externally coned portion of the collet is drawn into the internally coned end 44 of the sleeve 43 and the collet is contracted. The shaft 50 is rotated in the opposite direction to release the collet.

A bushing or adaptor 54 slidably receives the shank 55 of the tap 18. The bushing 54 is provided with a plurality of longitudinally extending slots 56 that permit the bushing to be contracted about the shank 55 and prevent movement of the tap with respect to the bushing. The bushing 54 is adapted to be received within the forward end of the collet 45 and, when the collet is contracted, the bushing and the tap 18 are secured against axial or rotational movement with respect to the bushing and collet. It is to be understood that bushings of various internal diameters may be employed so that taps of different shank diameters can be held within the work holder. However, it has been found that a single bushing is satisfactory to accommodate the shank of taps running from a quarter of an inch to an inch in cutting diameter. Alternatively, the bushing may be eliminated and the tap held directly by the collet. In this instance, it is preferable to use a different collet for each shank size.

The inner sleeve 43 is equipped with a flange or collar 57 at the forward end, and the collar is secured to the sleeve by means of a set screw 58. A helical spring 59 is positioned between the flange 57 and the forward end of the outer sleeve 41. The spring normally urges the inner sleeve 43 and collet assembly forwardly and into engagement with the abrasive wheel 13.

A cam member 60 is secured to the rearward portion of the inner sleeve 43 by a set screw 61. The set screw 61 is effective to lock the cam member 60 and the sleeve 43 so that there will be no relative movement therebetween. The cam member 60 has an enlarged end 62 provided with knurls thereon so that it may be gripped easily for purposes of rotation. A pin 63 extends laterally from the outer sleeve 41 and engages the forward edge 64 of the cam member 60. The cam 60 is positioned on the sleeve 43 so that the spring 59 is normally slightly compressed and the force of the spring 59 against the flange 57 and outer sleeve 41 holds the cam member 60 in tight engagement with the pin 63.

The forward edge 64 of the cam member 60 is provided with cam inclines or lobes 65 and valleys 66. The cam member 60 must be provided with the same number of lobes 65 as the tap being sharpened has fluted cutting surfaces. The lobes 65 are spaced about the leading edge 64 of the cam so as to correspond with the spacing of the fluted cutting surfaces of the tap. For example, if the tap 18 is provided with four equally spaced cutting surfaces, the cam member 60 must be provided with four equally spaced lobes. The sharpness of rise of the inclined edge extending between a rise or lobe 65 and a valley 66 will determine the amount of radial relief given to each fluted cutting surface. If the angle of incline is sharp, the tap will be backed away from the abrasive surface 13 quickly and the radial relief will be large. Contrariwise, if the incline is gradual, the radial relief will be less.

Operation

In operation, the handle 36 and wheel 35 are rotated in a direction to move the work holder 16 away from the abrasive wheel 13. When the work holder is withdrawn a sufficient distance, the knurled knob 52 of the shaft 50 is turned so as to loosen or expand the collet or coned sleeve 45. A tap requiring sharpening is inserted within the bushing 54 and the bushing and tap are inserted within the forward end of the collet 45. The shaft 50 is then rotated so as to draw the collet 45 into the forward end of the inner sleeve 43. This contracts the forward portion of the collet 45 and causes it to tighten about the bushing 54. The bushing in turn is contracted in diameter and tightens about the shank 55 of the tap 18 to rigidly secure it in position.

The set screw 25 is loosened and the collar 19 pivoted to the required angle. The set screw is then tightened to hold the collar 19 in the established position. A scale 70 calibrated in degrees may be provided on the vertical tube 22 so that the desired angular position of the collar 19 may be readily set. A calibration extending from zero, when the work holder is parallel with the abrasive wheel, to 30°, is found sufficient to accommodate the angle of chamfer of most taps. However, since the shaft 20 is rotatably as well as pivotally mounted within the tube 22, any desired angular positioning may be readily had.

After the required angle has been set, the shaft 34 is rotated so as to bring a fluted cutting surface of the tap 18 into engagement with the abrasive wheel 13. The cam 60 is then rotated (in the illustration the rotation will be counterclockwise) and each fluted cutting surface is successively turned into engagement with the abrasive wheel 13.

As the cam 60 is rotated, the forward edge 64 of the cam engaging the pin 63 causes the cam and the sleeve 43 attached thereto to move axially. This results in the fluted cutting surface of the tap being gradually withdrawn from engagement with the sharpening surface. The cam lobes 65 are so arranged that the tap is withdrawn clear of the sharpening wheel 13 when a land is adjacent the sharpening surface. The gradual withdrawal of the tap from the sharpening surface causes the cutting threads to be ground or sharpened with a radial relief. To accomplish this result, the trailing edge of the fluted cutting threads must first engage the sharpening wheel, since this point on the cutting threads has the smallest diameter as measured from the center of the tap. The leading edge of the cutting threads is last to be ground and the tap is almost clear of the sharpening surface when the leading edge engages the abrasive wheel. Thus, the cutting threads of the tap are ground with a radial relief.

If a tap is excessively long or short, it may be necessary to adjust the axial position of the outer sleeve 41 within the collar 19. This is readily accomplished by loosening the set screw 42 and adjusting the sleeve 41 as required.

For proper sharpening, the trailing edge of the tap 18 must be positioned to engage the abrasive wheel when a valley 66 of the cam 60 is in engagement with the pin 63. This may easily be done visually, or it is a simple matter to provide the work holder with a suitable scale arrangement to accomplish this result.

It is a simple and rapid process to remove the cam 60 and replace it with a cam having a different number of lobes 65. Thus, the work holder 16 may be readily adapted to accommodate taps having any number of fluted cutting surfaces. Also, the holder may be modified to sharpen a left-handed tap by replacing the cam 60 with one that may be rotated in the opposite direction.

It is to be understood that the work holder may be arranged to engage the peripheral surface of the sharpening wheel 13, since it is only necessary that a straight line cutting surface be provided when the abrasive wheel is in rotation. Of course, the peripheral surface of the wheel 13 would have to be sufficiently wide to permit engagement with the tap during the withdrawal operation.

It is seen that the work holder of my invention is of sturdy and simple construction. It has few moving parts, and inaccuracies caused by normal vibration resulting from rotation of the motor and abrasive wheel are greatly minimized. Yet, the work holder is quickly and accurately adjusted to accommodate taps having differing angles of chamfer and differing numbers of fluted cutting surfaces.

While in the foregoing specification I have described a specific structure in considerable detail for the purpose of illustrating an embodiment of my invention, it will be understood that this structure may be readily modified by those skilled in the art without departing from the spirit of my invention.

I claim:

1. In a device for sharpening the chamfered cutting surfaces of taps and like tools having a rotatably mounted abrasive wheel providing at least one substantially straight line cutting surface when rotating, a longitudinally adjustable carriage, and an adjustable work holder pivotally mounted thereon, comprising a collar having a bore therethrough pivotally mounted upon said carriage by means of a vertical shaft having its lower portion of reduced diameter and pivotally received in a vertical tube which is secured to said carriage, an outer sleeve longitudinally adjustable within said bore, an inner sleeve slidably and rotatably mounted within said outer sleeve and extending therethrough and being provided with a flange secured to the forward end thereof and further being provided with an internally coned forward end, spring means engaging said flange and normally urging said inner sleeve forwardly, a cam secured to the rearwardly extending end of said inner sleeve and provided with a lobe for each fluted cutting surface of the tool being sharpened, a pin extending laterally from the rearward portion of said outer sleeve and engaging said cam and thereby arresting the forward movement of said cam and inner sleeve against the urging of said spring, said cam further being provided with means for rotating the cam, an externally coned sleeve having at least one longitudinal slot therein slidably mounted within the coned end of said inner sleeve and provided with a rearwardly extending externally threaded portion restricted in diameter, a shaft rotatably and slidably mounted within said inner sleeve and having a threaded bore in the forward end thereof adapted to engage the threaded portion of said coned sleeve, and a bushing having at least one longitudinal slot therein adapted to be received within said coned sleeve when it is in expanded condition and further adapted to receive the shank of a tool being sharpened and to be contracted to secure the tool against movement when said coned sleeve is drawn into said inner sleeve.

2. In a sharpener for taps and like tools, including an abrasive wheel with a sharpening surface, a carriage comprising a plate having an inverted V-shaped channel along one longitudinal edge and bottom thereof, a recess at the other longitudinal edge and bottom of the plate, a vertical runner received in said V-shaped channel, a rectangular runner in said recess, end sections secured to each of said runners in parallel, said plate having a collar to receive a threaded shaft and means for longitudinally adjusting said plate, a work holder pivotally mounted upon said carriage and adapted to be adjusted so that the chamfered end of a tap engages the sharpening surface, said work holder comprising a horizontally mounted collar, a sleeve slidably and rotatably mounted within said collar, an expansible sleeve mounted within the forward end of said slidably and rotatably mounted sleeve and adapted to be contracted about the shank of a tap inserted therein to hold it against movement, means for expanding and contracting said expansible sleeve, a spring normally urging said slidable sleeve forwardly of said collar, and a cam having a lobe for each fluted cutting surface of a tap received within said expansible sleeve, said cam being adapted to withdraw said slidably mounted sleeve rearwardly of said collar and to permit it to be drawn forwardly under the urging of said spring successively as said cam is rotated, whereby a tap received within said expansible sleeve is cyclically moved forwardly into engagement with an abrasive wheel when a cutting surface of the tap is adjacent the abrasive wheel and to be gradually withdrawn until it is removed from engagement with the abrasive wheel when a land of the tap is adjacent the abrasive wheel, with the result that each cutting surface of the tap is ground with a radial relief.

3. In a sharpener for taps and like tools, said sharpener having an abrasive wheel with a sharpening surface, a carriage having means for longitudinally adjusting said carriage, said carriage comprising a plate having an inverted V-shaped channel along one longitudinal edge and bottom thereof, a recess at the other longitudinal edge and bottom of the plate, a vertical runner received in said V-shaped channel, a rectangular runner in said recess, end sections secured to each of said runners in parallel, said plate having a collar to receive a threaded shaft and means for longitudinally adjusting said plate, a work holder pivotally mounted upon said carriage and adapted to be adjusted so that the chamfered end of a tap engages the sharpening surface, said work holder comprising a horizontally mounted collar having a bore therethrough pivotally mounted upon said carriage by means of a vertical shaft having its lower portion of reduced diameter and pivotally received in a vertical tube which is secured to said carriage, a sleeve slidably and rotatably mounted within said collar, an expansible sleeve mounted within the forward end of said slidably and rotatably mounted sleeve and adapted to be contracted about the shank of a tap inserted therein to hold it against movement, means for expanding and contracting said expansible sleeve, a spring normally urging said slidable sleeve forwardly of said collar, and a cam having a lobe for each fluted cutting surface of a tap received within said expansible sleeve, said cam being adapted to withdraw said slidably mounted sleeve rearwardly of said collar and to permit it to be drawn forwardly under the urging of said spring successively as said cam is rotated, whereby a tap received within said expansible sleeve is cyclically moved forwardly into engagement with the abrasive wheel when a cutting surface of the tap is adjacent the abrasive wheel and to be gradually withdrawn until it is removed from engagement with the abrasive wheel when a land of the tap is adjacent the abrasive wheel, with the result that each cutting surface of the tap is ground with a radial relief.

References Cited in the file of this patent

UNITED STATES PATENTS

| Number | Name | Date |
| --- | --- | --- |
| 344,329 | Ryder | June 22, 1886 |
| 1,698,807 | Willhauck | Jan. 15, 1929 |
| 1,733,087 | Heim | Oct. 22, 1929 |
| 1,981,174 | Hille | Nov. 20, 1934 |
| 2,024,268 | Bausch et al. | Dec. 17, 1935 |
| 2,099,724 | Cogsdill | Nov. 23, 1937 |
| 2,281,930 | Flygare et al. | May 5, 1942 |
| 2,325,364 | Boening | July 27, 1943 |
| 2,363,482 | Clarke | Nov. 28, 1944 |
| 2,436,535 | Walther | Feb. 24, 1948 |
| 2,442,318 | Weisel | May 25, 1948 |
| 2,482,802 | Sanders | Sept. 27, 1949 |